United States Patent Office 3,839,400
Patented Oct. 1, 1974

3,839,400
AMINOMETHYL GLUTARONITRILES
Stiles M. Roberts, Loudonville, and Lester N. Stanley, Delmar, N.Y., assignors to GAF Corporation, New York, N.Y.
No Drawing. Filed May 16, 1972, Ser. No. 253,830
Int. Cl. C07c 121/78
U.S. Cl. 260—465 E                    7 Claims

ABSTRACT OF THE DISCLOSURE

There are disclosed dyestuff intermediates particularly useful for the production of disperse and soluble dyes for synthetic fibers by coupling with diazos, which intermediates have the following formula:

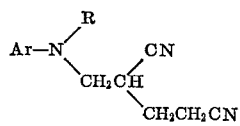

wherein Ar is an aryl radical devoid of substituents in the position para to the amino group and thus being capable of coupling at the position para to the amine substituent, and R is hydrogen, an alkyl radical or a substituted alkyl radical. When the R substituent contains an amino radical there are also provided the quaternary ammonium salts of these compounds which form water-soluble dyestuffs, and the corresponding cyclic amides and imides.

BACKGROUND OF THE INVENTION

Field of the Invention

This invention relates to a novel class of dyestuff intermediates and more particularly to dyestuff intermediates derived from alpha-methyleneglutaronitrile which are particularly useful for the production of disperse dyes for synthetic fibers.

Description of the Prior Art

With the introduction of synthetic fibers and synthetic textile materials, the demand for improved dyeing processes and products for use in dyeing these materials has substantially increased. The dyestuffs conventionally known to the art for dyeing natural products were generally found unsatisfactory because of lack of fastness to light or for other reasons. Efforts to overcome these drawbacks of conventional dyeing materials have resulted in the development of a large number of various types of dyestuffs which have been used in the dyeing of synthetic fibers.

A large body of art is concerned with azo dyestuffs and, particularly for azo dyestuffs useful in dyeing synthetic fibers. The present invention provides a novel class of dyestuff intermediates which are easily converted to disperse dyes which have been found particularly useful for dyeing synthetic fibers. These dyestuff intermediates are derived from alpha-methylene-glutaronitrile by reaction of this compound with an aryl amine. It has been found that these products are particularly useful as dyestuff intermediates for coupling with a diazo moiety to form disperse dyes which are very effective in coloring synthetic fibers.

SUMMARY OF THE INVENTION

It is accordingly one object of this invention to provide a new class of dyestuff intermediates for use in the production of disperse dyes for synthetic fibers.

A further object of this invention is to provide a new class of dyestuff intermediates derived from the reaction of alpha-methyleneglutaronitrile with an aryl amine.

A still further object of the invention is to provide a method for the production of the novel dyestuff intermediates of this invention.

Other objects and advantages of the present invention will become apparent as the description thereof proceeds.

In satisfaction of the foregoing objects and advantages, there is provided by this invention a novel class of dyestuff intermediates of the following formula:

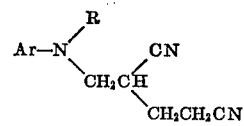

wherein Ar is an aryl radical which is capable of coupling in para position to the amine substituent and R is hydrogen, an alkyl radical or substituted alkyl radical, all as defined more specifically hereinafter. When R is amino substituted there are also provided the quaternary ammonium derivatives which form water soluble dyes, as well as the corresponding cyclic amides and imides. Also provided is a novel method for the production of these compounds by reaction of alpha-methyleneglutaronitrile with an aryl amine.

DESCRIPTION OF PREFERRED EMBODIMENTS

The novel dyestuff intermediates of the present invention react with diazos to provide dyes which are particularly useful as disperse dyes for synthetic fibers and particularly synthetic fibers such as the acetates, triacetates, nylons, polyesters and soluble basic dyes for polyacrylonitriles. When applied to synthetic fibers, these dyestuff intermediates have been found to have excellent fastness to light and sublimation. When a dyestuff is applied by the thermosol method of dyeing, wherein the fiber treated with dyestuff is exposed to intense heat for a short time, and the dyestuff sublimes, the dyeing is affected in strength and brightness and the equipment in surrounding areas becomes contaminated with dye. The intermediates of the present invention provide products which overcome these disadvantages of the prior art products and provide superior light fastness, sublimation fastness, wash and perspiration fastness over similar dyes known in the art.

As indicated, the present invention is concerned with a novel class of dyestuff intermediates which have been found particularly useful in the production of disperse dyes for synthetic fibers. These dyestuff intermediates are of the following formula:

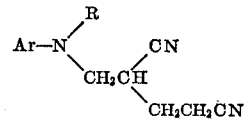

wherein Ar is a substituted or unsubstituted aryl radical devoid of substituents in the position para to the amino group to permit coupling and R is hydrogen, an alkyl radical or a substituted alkyl radical. When R is amino substituted there are also provided the corresponding quaternary ammonium salts and cyclic amides and imides. More particularly, in the above formula Ar is naphthyl or an aryl radical of the following formula:

wherein the above formula $R_1$ and $R_2$ are hydrogen, alkyl of 1 to 7 carbons, alkoxy of 1 to 7 carbons, halogen, trifluoromethyl, an amide group i.e., $R_3CONH-$, alkoxycarbonyl, i.e., $R_3OCO-$ where $R_3$ is alkyl of 1 to 7 carbons or phenyl and the like. Preferred substituents for $R_1$ and $R_2$ are hydrogen, methyl, methoxy, ethoxy, chloro, bromo, fluoro, CF₃ acetamido benzamido and carbalkoxy. Highly preferred compounds of this type are those of the formula:

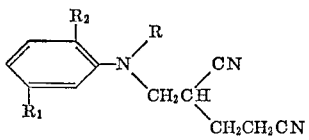

wherein R₁ is H, Cl, CH₃ or R₃CONH—, R₂ is H, CH₃, lower alkoxy of 1 to 4 carbon atoms, and R and R₃ are as described above.

The substituent R in the formula above is defined as hydrogen, an alkyl radical or a substituted alkyl radical. More particularly, it is preferred that R be hydrogen, an alkyl radical of 1–20 carbon atoms, a haloalkyl or dihaloalkyl radical of 1–4 carbon atoms, cyanoalkyl where the alkyl group has 1–3 carbon atoms, aminoalkyl or diaminoalkyl of 1–4 carbons, the quaternary ammonium, amide and imide derivatives thereof, hydroxyalkyl or dihydroxyalkyl of 1–4 carbon atoms, epoxyalkyl or 1–4 carbon atoms, halohydroxyalkyl of 1–4 carbon atoms, sulfatoalkyl of 1–4 carbon atoms, cyanohydroxyalkyl of 1–4 carbon atoms, alkoxyalkyl of 1–10 carbon atoms, carboalkoxyalkyl of 1–10 carbon atoms, carboxyalkyl esters of 1–10 carbon atoms or carboxyalkyl amides of 1–10 carbon atoms. Highly preferred substituents for R are as follows:

methyl
ethyl
propyl
isopropyl
butyl
isobutyl
tert-butyl
amyl
hexyl
octyl
dodecyl
octadecyl
2-chloroethyl
2-chloropropyl
3-chloropropyl
4-chlorobutyl
2-bromoethyl
2,3-dichloropropyl
2-aminoethyl
trimethylammoniumethyl
pyridinium ethyl
succimidoethyl
2-cyanoethyl
2-hydroxyethyl
2-hydroxypropyl
3-hydroxypropyl
2,3-dihydroxypropyl
2,3-epoxypropyl
3-chloro-2-hydroxypropyl
3-bromo-2-hydroxypropyl
2-sulfatoethyl
3-cyano-2-hydroxypropyl
2-lower alkoxyethyl
3-lower alkoxypropyl
2-carbomethoxyethyl
2-carboethoxyethyl
2-carbobutoxyethyl
3-carbomethoxypropyl
carboxymethyl, methyl ester
carboxymethyl, ethyl ester
carboxymethyl, butyl ester
2-carboxyethyl, ethyl ester
carboxymethyl, dimethylamide The products of this invention are produced by the reaction of alpha-methyleneglutaronitrile of the formula:

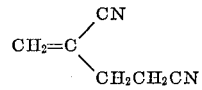

with at least an equivalent amount of an aryl amine of the following formula:

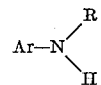

wherein Ar and R have the values ascribed above. Preferred arylamines for use in the reaction are as follows:

aniline
o- and m-toluidine
o- and m-anisidine
o- and m-phenetidine
o- and m-chloroaniline
o- and m-bromoaniline
o- and m-fluoroaniline
o- and m-trifluoromethylaniline
m-acetamidoaniline
m-benzoylamidoaniline
m-carboalkoxyaniline
6-methyl-m-anisidine
5-methyl-o-anisidine
6-methyl-m-acetamidoaniline
6-methoxy-m-acetamidoaniline
2,5-dimethoxyaliline
2,5-dichloroaniline
1-naphthylamine The alpha-methyleneglutaronitrile and aryl amine may be generally reacted in equivalent amounts, that is, on a mole to mole basis to obtain the products. The reaction is preferably carried out by contacting the reactants in the presence of a small amount of a metal salt catalyst and heating at a temperature of about 75° C. to the reflux point of the reaction for from 10 hours to 5 days. A solvent inert to the reactants may be used in the reaction, for example, from about 0.5 to about 5 moles of an inert solvent such as dioxane, methyl pyrrolidone, dimethylformamide, alkyl ethers, carbon tetrachloride, aromatic hydrocarbons including benzene, toluene and xylene, halogenated hydrocarbons such as chlorobenzene and the like may be used. It is highly preferred however to use as the solvent an excess of up to 5 moles of the amine reactant per mole of the alpha-methyleneglutaronitrile as excellent results are obtained thereby. As pointed out, the presence of catalytic amounts of any of the usual condensation catalysts also favorably influence the reaction. Preferred cataylsts which may be used include cupric acetate, cuprous chloride, acetic acid and the like, all of which are well known in the art.

In practicing the reaction, the aryl amine, solvent or excess amine, catalyst and alpha-methyleneglutaronitrile are combined in the appropriate amounts and the reaction mixture heated to reflux until the reaction is complete. The reaction may also be carried out in an autoclave under pressure wherein the time required for the reaction will be correspondingly reduced.

After completion of the reaction it is preferred to distill off the excess amine or solvent although in some cases this may not be necessary. The product is then isolated in the usual maner of isolating solid products of this general type. One effective method is to drown the reaction mass in very cold water, keeping it chilled until crystallization occurs and then filtering. If desired the product may then be washed with cold water and dried.

While the above is one procedure for conducting the process, in practice it has been found preferable to initially react the alpha-methyleneglutaronitrile with approximately an equivalent amount of a primary amine of the formula:

where Ar is as described above, rather than the secondary amine, as it is difficult to react alpha-methyleneglutaronitrile with the above described secondary amines because of steric hindrance. In this procedure then, the reaction described is conducted and then the R substituent is attached to the nitrogen of the amine. It has been found that the thus formed secondary amine can be alkylated to provide the R substitutent in known manner.

If the reaction is conducted under such conditions that alkylation is required, that is, with the primary amine, alkylation may then be carried out for example by charging the required molar amount of the amine into an excess of an inert solvent such as aliphatic alcohol or aqueous alcohol solution and an equivalent amount, preferably an excess, of the sulfate of the group to be introduced. Catalysts and other materials may be added as desired and known in the art. The reaction mixture is then heated, preferably at the reflux point of the system. Any solids are then filtered off, the solvent is removed by distillation and the solution cooled to provide the solid or semisolid product. In cases where a halogenated substituent or halo-substituted group is desired, heating the hydroxyethyl product with an excess of a halogenating agent, e.g., thionyl chloride, until hydrogen halide evolution ceases will produce products of this type.

In these products where R is a halogenated radical, such as a haloalkyl radical, it is also preferred and within the scope of this invention that such compounds be further reacted with a tertiary amine to form preferably tertiary or quaternary ammonium derivatives thereof. These quaternary ammonium salts form a valuable embodiment of the invention since they form dyestuffs which are water-soluble and therefore excellent basic dyes for polyacrylonitrile fibers.

To accomplish this, the N-haloalkylarylamine, prior to distilling off the solvent, is treated with a tertiary amine. The reaction is warmed usually to or near the reflux and held there for 30 minutes to about 24 hours. The intermediate can be isolated by evaporating to dryness. However, it is preferable to use it as a coupler without isolation to form the dyestuffs. In this reaction, the tertiary amine may be of the following formula:

$$N(R_4)_3$$

wherein $R_4$ is alkyl of 1 to 5 carbons, aralkyl of 7 to 14 carbon atoms or together with the nitrogen atom, a heterocyclic radical. Preferable amines for use in the reaction are as follows:

trimethylamine
triethylamine
tributylamine
pyridine, picoline, lutidines and other substituted pyridines
morpholine
quinoline These quaternary ammonium derivatives may be described by the following general formula:

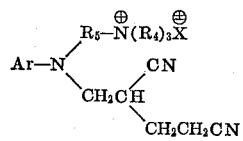

wherein Ar is as defined above, $R_5$ is a straight or branch chained alkylene group of 1 to 7 carbon atoms, $R_4$ is as above and $X^\ominus$ is the cation of a mineral acid, such as HCl, HNO$_3$, H$_2$SO$_4$, etc. In this formula $R_5$ is preferably —CH$_2$—, —CH$_2$CH$_2$—, $$-C(CH_3)_2-$$

—CH$_2$CH$_2$CH$_2$— and X is Cl$^\ominus$ or Br$^\ominus$. Highly preferred compounds within this group are those wherein $R_5$ is as indicated and $R_4$ is

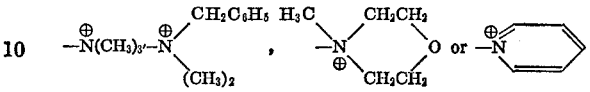

Various other subsequent reactions may be carried out on the products of the invention to provide a wide variety of new compounds. For example, when the R substituent is a primary alkyl halide, Delepine's reaction with hexamethylene tetramine may be carried out to form the hexaminium halide which may then be hydrolyzed to the amine with aqueous mineral acid.

With respect to subsequent reactions carried out on the intermediates of the invention, there are also provided herein certain dye intermediates containing cyclic amides and imides. The dyes from these intermediates form particularly color-fast dyes for hydrophobic fibers. These compounds are prepared from the intermediates of this invention when R is an amino substituted group, preferably such as aminoethyl as described above. These novel intermediates may be described by the following general formula:

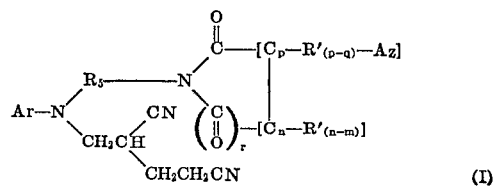

(I)

wherein the R's are independently selected from hydrogen, halogen, hydroxy, alkyl, substituted alkyl (e.g. chloroalkyl, bromoalkyl, hydroxyalkyl, alkoxyalkyl, cyanoalkyl, carbalkoxyalkyl, and the like), aryl, substituted aryl (e.g. phenyl, tolyl, xylyl, alkoxyphenyl, chlorophenyl, carbalkoxyphenyl, sulfamidophenyl, carboxamidophenyl, alkylsulfonylphenyl, alkylaminophenyl, and the like), cycloalkyl and the like, wherein the alkyl groups have 1 to about 7 carbon atoms, the aryl groups have 6 to about 12 carbon atoms and the cycloalkyl groups have 3 to about 8 carbon atoms;

A is selected from oxygen, nitrogen or sulfur;
$n$ and $p$ are integers having values from 0 to 15;
$n+p$ has a value of at least 2;
$z$ is an integer having a value of 0 or 1;
$r$ is an integer having a value of 0 or 1;
$n+p+z+r$ have a value of at least 3;
$m$ and $q$ are the number of double bonds in the $C_n$ and $C_p$ moieties;
in the case where $r$ is 1, $z$ is 0, and $n$ and $p$ are each 1, one R' of each carbon atom may jointly form a 6-membered aryl ring having 6 to 12 carbon atoms.

Quaternary derivatives of the above defined dyes are also encompassed within the scope of the present invention.

Alternatively, these novel dyestuff intermediates of the present invention can be represented by the following formula:

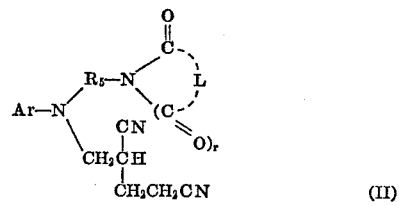

(II)

wherein r is as defined above. The radical

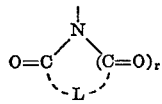

represents the nucleus of a cyclic amide or imide preferably a five or six membered cyclic amide or imide, and L represents an organic radical containing from 0 to 1 hetero atoms selected from oxygen, sulfur and nitrogen and being selected from substituted or unsubstituted, saturated and unsaturated radicals. The radical L can be substituted by the groups represented by R' in Formula I above and may contain unsaturation as represented by $m$ and $q$ in Formula I.

Additionally, the above dyes can be in the form of their quaternary salt.

These coupling components may be prepared in any conventional and convenient manner. However, it has been found that a convenient method of preparing the lactam compounds is by autoclaving the appropriate amine with an approximately equivalent amount of the desired lactone. The temperature, pressure and time of the autoclaving can vary considerably, a temperature of about 200–400° C., a pressure of about 150–400 lbs., and a time from about 5 to 10 hours being preferred.

Specific lactones which may be used as reactants for producing the lactam substituent include the following:

butyrolactone and the following substituted butyrolactones:
  3-methyl
  4-methyl
  5-methyl
  3-ethyl
  4-ethyl
  5-ethyl
  3,3-dimethyl
  4,4-dimethyl
  5,5-dimethyl
valerolactone and the following substituted valerolactones:
  3-methyl
  4-methyl
  5-methyl
  6-methyl
  γ-valerolactone
  γ-chloro-γ-methylbutyrolactone
  γ-chloromethylbutyrolactone
  α-bromo-γ-chloromethylbutyrolactone
  δ-caprolactone
  τ-caprolactone
  3-ethylbutyrolactone
  5,5-dimethylbutyrolactone
  4,5-dimethylbutyrolactone
  4,bromo-3,3-dimethylbutyrolactone
  5-ethyl-5-methylbutyrolactone
  3,3,4-trimethylbutyrolactone
  5-amylbutyrolacetone While the above represents a rather broad class of compounds of this type, a highly preferred class comprises compounds of the formula:

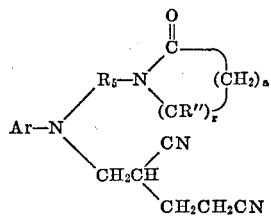

wherein Ar and $R_5$ are as above, R'' is =O or $H_2$, $r$ is 0 or 1, and $a$ is an integer of 1 to 12, together with condensed aryl rings attached to adjacent carbon atoms of the ring. Preferred compounds of this class are those wherein the amide moiety is of the formulae:

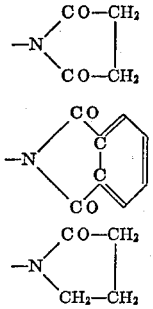

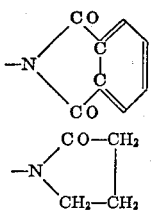

In preparing these compounds, the amides are prepared from the corresponding lactones as described above. However, in preparing the imides, a preferred procedure is to react the amine with a dibasic acid anhydride including the anhydrides of malonic acid, succinic acid, glutaric acid, adipic acid, pimelic acid, suberic acid, azelaic acid, sebacic acid and brassylic acid as well as the lower alkyl substituted derivatives thereof and these anhydrides which have benzene rings attached to adjacent carbon atoms on the ring, e.g. phthalic anhydride.

This reaction is conducted by contacting the amine and anhydride in molar ratios and heating gradually until an exothermic reaction is initiated. After the temperature begins to fall, it is then heated at a temperature of 125–150° C. for 1 to 2 hours, cooled below 100° C. and drowned into an excess of ice water containing a base. The product is then filtered off and dried.

The products resulting from this reaction are imide derivatives of the formula:

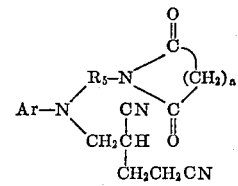

wherein Ar, $R_5$ and $a$ are as defined above, together with these compounds which have benzene rings condensed at adjacent carbon atoms on the imide ring.

As pointed out above, the products of this invention are very unique in that they provide a novel class of dyestuff intermediates particularly for use in the production of both dispersed and water-soluble dyes and water-soluble cationic dyes for synthetic fibers. This is possible because the position para to the nitrogen group on the aryl ring is free of substituents so that the intermediates can be coupled with a diazo compound to form the dye. Thus in one embodiment, the intermediates are coupled to a diazo of the formula:

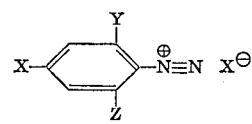

wherein X is a negative group, such as $NO_2$, lower alkyl sulfonyl, CN, $CF_3$, lower carboalkoxy, sulfonamide, mono- or di-lower alkyl sulfonamide, carboxamide, and mono- or di-lower alkyl sulfonamide, carbonyl- and sulfonyl-morpholide and piperidide; Y is H, Cl, Br, F or the same as X; Z is H, Cl, Br or F, CN, $CF_3$, lower carboalkoxy; and $X^{\ominus}$ is the cation of a mineral acid, e.g. $Cl^{\ominus}$ or $Br^{\ominus}$. Diazotized p-nitroaniline, 2,4-dinitro-6-chloroaniline, 2,6-dichloro-4-nitroaniline and 2-chloro-4-nitroaniline are especially preferred reactants.

The diazotization of the amine and coupling reaution may be carried out in a known manner, for example, as shown in U.S. Pat. Nos. 2,099,525 or 3,079,377, by reacting the amine with nitrosyl sulfuric acid at a temperature of about 0–30° C. or sodium nitrite in aqueous mineral acid such as sulfuric acid or hydrochloric acid at a temperature of about 0–20° C. The excess nitrite may be later removed by treatment with sulfamic acid. The resulting diazotized amine is then coupled with an equivalent amount or up to equivalent excess of 10% by weight of the intermediate coupler of this invention by adding a solution of the latter in dilute mineral acid aqueous solution to the diazo solution portionwise over a period of time if necessary to complete the coupling. The resulting mixture is subsequently brought up to a pH of 4–5 by the careful addition of sodium acetate or a base such as an alkali metal hydroxide, alkali metal carbonate or alkali metal bicarbonate, with agitation and the solid product separated if desired.

If coupler amine is basic enough, it can be dissolved in dilute aqueous mineral acid (e.g. HCl or H₂SO₄) containing a small amount of sulfamic acid (which destroys any excess nitrous acid) and the diazo run into the coupler solution in an alternative coupling reaction.

The dye is usually recovered as a powder and can be treated with dispersing agents in the same manner employed in the preparation of dispersed acetate dye pastes to obtain a dispersible dye. Alternatively, a 40–50 percent active dispersed powder can be employed in a similar manner but in lesser amounts. On the other hand, when water-soluble dyes are formed from the quaternary ammonium intermediates they may be used as solutions in dyeing polyacrylonitriles particularly.

Dispersing agents such as sodium lignosulfonate and alkylarylsulphonates and the products resulting from the condensation of sulphonated aromatic derivtives with aldehydes, such as the methylene-dinaphthylsulphonates, are particularly valuable auxiliary substances since they allow the preparation of good dispersion of the dyestuffs and facilitate the taking up of the latter on the fibers. On the other hand, "carriers," such as mono- or poly-chlorinated derivatives of the benzene series or diphenyl, can be added to the dye bath or to the printing pastes. These substances exert a swelling action of the fibers and are capable of improving the tinctorial yield.

In carrying out the dyeing procedure of the persent invention, about 20 weight percent active dispersed paste of the dyestuff is dissolved in water at concentrations of from about 1.0 to 15.0 ounces per gallon. The solution is thickened to suitable padding consistency by the addition of conventional thickeners such as gum tragacanth in quantities normally about twice that of the water employed.

The dyeing may be carried out by any desired method such as the thermosol method of high temperature dyeing. Thus dyeing may be effected by impregnating the synthetic fibers by padding or printing with an aqueous suspension or solution of the dye at an elevated temperature, drying the fiber and subsequently subjecting to a heat treatment at a temperature of from about 390° F. to about 440° F. for a period of time sufficient to develop the full color.

The following examples illustrate the invention but are not intended to be limitative thereto. In the examples and throughout the specification, parts are by weight unless otherwise indicated.

EXAMPLE 1

A total of 321 grams of m-toluidine, 106 grams of α-methyleneglutaronitrile and 10 grams of cupric acetate are combined and heated to and maintained at a temperature of 125–130° C. and 60 hours. Excess m-toluidine is distilled off, the brown syrupy reaction mass is cooled to about 90° C. and gradually run into a mixture of 2000 cc. of water and 1000 grams of ice with vigorous stirring and in an ice bath. The crystals are filtered, washed several times with cold water and dried. An 82% yield, based on the α-methyleneglutaronitrile, is obtained.

The product is believed to have the formula:

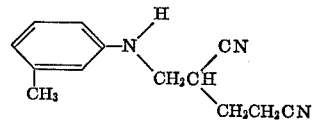

Recrystallization from isopropanol gives light brown crystals. Carbon analysis showed C-73.80%.

EXAMPLE 2

A total of 100 cc. of dioxane, 3.7 grams of cupric acetate, 108 grams of N-ethyl-m-toluidine and 90 grams of α-methyleneglutaronitrile are combined and heated to about 100° C. for 44 hours. An additional 3.7 grams of cuprous chloride and 55 cc. glacial acetic acid are added and heating, is continued for another 42 hours. The charge is cooled to 0–5° C., filtered, washed with cold water and dried. The product has the formula:

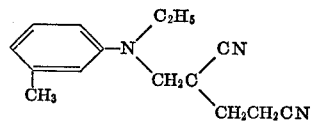

When spot tested with p-nitroaniline diazo, an orange color develops, with 2,4-dinitro-6-chloroaniline diazo a violet color develops, and with 2-chloro-4-nitrodiazo a reddish bordeaux color develops.

EXAMPLE 3

150 grams of m-aminoacetanilide, 212 grams of α-methyleneglutaronitrile and 10 grams of cupric acetate are combined and heated to the reflux and held there for 60 hours. Excess α-methyleneglutaronitrile is distilled off. The reaction mass is cooled somewhat and then drowned in a mixture of 2000 cc. of water and 1000 gms. of ice with vigorous stirring and in an ice bath. The crystals are filtered, washed with cold water and dried. The product has the formula:

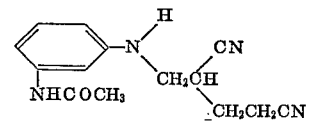

EXAMPLE 4

374 grams of 5-methyl-o-anisidine, 106 grams of α-methyleneglutaronitrile and 10 grams of cupric acetate are combined and heated to and held at the reflux for 60 hours. Excess 5-methyl-o-anisidine is then distilled off. The reaction mass is cooled somewhat and then drowned in a mixture of 2000 cc. water and 1000 gms. of ice with vigorous stirring and in an ice bath. The crystals are filtered, washed with cold water and dried. The product has the formula:

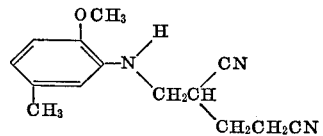

EXAMPLE 5

311 grams of N-(2-chloroethyl)aniline, 106 grams of α-methyleneglutaronitrile and 10 grams of cupric acetate are combined, and heated to and maintained at the reflux for 60 hours. The excess N-(2-chloroethyl)aniline is distilled off, the reaction mass is cooled somewhat and then drowned into a mixture of 2000 cc. of water and 1000 gms. of ice with rapid stirring in an ice bath. The crystals are filtered, washed with cold water and dried. The product has the formula:

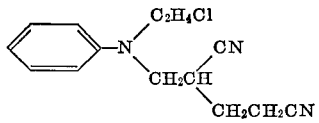

130 grams of this product are then refluxed with 500 cc. of 40% aqueous trimethylamine solution until a small sample removed is found to be completely water soluble, a sign of complete conversion to the quaternary ammonium salt. The product has the formula:

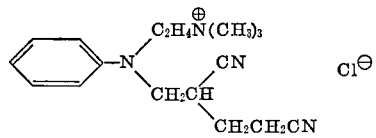

EXAMPLE 6

21.3 grams of the product of Example 1 (0.1 mol), 16 grams of ethylene chlorohydrin, 20 grams of precipitated chalk, 150 cc., isopropanol, and 50 cc. of water are refluxed for 24 hours. The dissolved calcium is precipitated as $CaSO_4$, the resulting reaction mass filtered from the $CaSO_4$, the isopropanol distilled off from the filtrate, the aqueous solution cooled in an ice bath and the product filtered off and dried in a 50° C. vacuum oven.

The resulting N-hydroxyethyl-N-dicyanobutyl compound is then refluxed with excess thionyl chloride until no further evolution of HCl occurs and the excess thionyl chloride is distilled off to provide the N-chloroethyl-N-dicyanobutyl derivative.

The resulting N-chloroethyl-N-dicyanobutyl compound is reacted according to Delepine's method by heating with hexamethylene tetramine to form the hexaminimum chloride and the hydrolyzed by heating with ethanol and concentrated HCl to the HCl salt of the N-aminoethyl-N-dicyanobutyl derivative. The amine is set free by neutralizing with sodium carbonate, filtered off cold and allowed to air dry. 27.6 grams (0.1 mol) of the aminoethyl compound and 10 grams (0.1 mol) of succinic anhydride are mixed intimately and heated gradually until an exothermic reaction begins. After the temperature begins to fall, it is heated to 135–140° C. for one hour. The melt is then cooled below 100° C. and drowned into 2 liters of ice and water containing 10 grams of $Na_2CO_3$. The product is filtered off and washed with water and dried. It has the following structure:

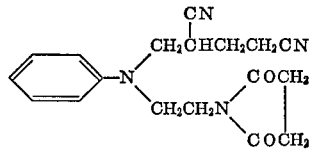

EXAMPLE 7

44.5 grams of the coupler of Example 1 are dissolved in a mixture of 325 cc. of concentrated hydrochloric acid and 175 cc. of water and clarified from slight insolubles. 29 grams of p-nitroaniline are diazotized in known manner and run into the above prepared coupler solution which is at a temperature of 0–10° C. Water is added to a total volume of 3000 cc. After several hours stirring, the orange dye is filtered, washed with cold water and dried, 8 grams of dye are dispersed by viscous milling with 11 grams Marasperse CB (sodium lignosulfonate), 0.5 grams of Nekal BX–78 (sodium alkylnaphthalenesulfonate), 0.5 grams of Nekal WS–25 and 0.2 grams sodium carbonate. Dacron is colored in bright solid orange shade, especially fast to sublimation at the high temperatures used in the thermosol dyeing process, and having good light fastness.

The invention has been described herein with reference to certain preferred embodiments. However, as obvious variations will appear to those skilled in the art, it is not to be considered as limited thereto.

What is claimed is:

1. A product of the following formula:

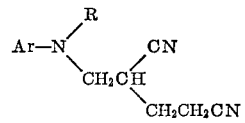

wherein Ar is naphthyl or a phenyl radical of the formula:

wherein $R_1$ and $R_2$ are independently hydrogen, alkyl of 1 to 7 carbons, alkoxy of 1 to 7 carbons, halogen, or acetamido, providing that the position on the ring para to the amino group is devoid of substituents; and R is hydrogen, an alkyl radical of 1–20 carbon atoms or a haloalkyl or dihaloalkyl radical of 1–4 carbon atoms.

2. A product according to claim 1 wherein Ar is a radical of the formula:

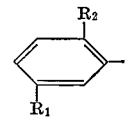

where $R_1$ is H, Cl, $CH_3$ and acetamido or $R_2$ is H, $CH_3$ or alkoxy of 1–4 carbon atoms.

3. A product according to claim 2 wherein $R_1$ is methyl and R and $R_2$ are hydrogen.

4. A product according to claim 2 wherein $R_1$ is methyl, $R_2$ is hydrogen and R is ethyl.

5. A product according to claim 2 wherein $R_1$ is acetamido and R and $R_2$ are hydrogen.

6. A product according to claim 2 wherein $R_1$ is methyl, $R_2$ is methoxy and R is hydrogen.

7. A product according to claim 2 wherein $R_1$ and $R_2$ are H and R is 2-chloroethyl.

References Cited

UNITED STATES PATENTS 3,444,137    5/1969    Higginbottom et al. _ 260—465 X

OTHER REFERENCES

Ichikawa et al.: Chemical Abstracts, vol. 74, p. 270 (1971).

ELBERT L. ROBERTS, Primary Examiner

D. H. TORRENCE, Assistant Examiner

U.S. Cl. X.R.

260—144, 152, 205, 247.2 A, 247.2 B, 247.5 R, 281, 293.75, 294.9, 283 CN, 348 A, 348 R, 465 D